(12) United States Patent
Okrainetz et al.

(10) Patent No.: US 11,196,902 B2
(45) Date of Patent: Dec. 7, 2021

(54) CAMERA WITH LOCKABLE AXES OF ROTATION

(71) Applicant: MOTOROLA SOLUTIONS, INC., Chicago, IL (US)

(72) Inventors: Christopher James Cullington Okrainetz, Vancouver (CA); Nigel Geoffrey Taylor, Maple Ridge (CA); Andrew Luk Po Wu, Richmond (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/695,931

(22) Filed: Nov. 26, 2019

(65) Prior Publication Data

US 2021/0160402 A1     May 27, 2021

(51) Int. Cl.
*H04N 5/225* (2006.01)
*G03B 17/02* (2021.01)
*G03B 17/56* (2021.01)

(52) U.S. Cl.
CPC .......... *H04N 5/2252* (2013.01); *G03B 17/02* (2013.01); *G03B 17/566* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 4,341,452 A * | 7/1982 | Korling | ............... | F16M 11/105 248/179.1 |
| 4,457,610 A | 7/1984 | Kawazoe | | |
| 9,473,606 B1 * | 10/2016 | Sumida | ............. | H04N 5/23203 |
| 10,167,992 B2 | 1/2019 | Stark et al. | | |
| 2006/0147194 A1 * | 7/2006 | Jones | ............... | G08B 13/19632 396/427 |
| 2006/0239677 A1 * | 10/2006 | Friedrich | ............... | F16M 11/18 396/419 |
| 2007/0041727 A1 * | 2/2007 | Lee | ......... | G03B 17/02 396/427 |
| 2008/0013944 A1 * | 1/2008 | Yamane | ................ | F16M 11/18 396/427 |
| 2009/0021634 A1 * | 1/2009 | Chang | .................. | H04N 5/2252 348/372 |
| 2011/0019074 A1 * | 1/2011 | Lee | ...................... | H04N 5/2251 348/373 |
| 2015/0304532 A1 * | 10/2015 | Bart | ..................... | H04N 5/2251 348/373 |
| 2017/0205686 A1 * | 7/2017 | Bingleman | ............ | G03B 17/08 |

(Continued)

OTHER PUBLICATIONS

HD Micro Dome Cameras—Avigilon, avigilon.com, May 2016, all pages.

(Continued)

*Primary Examiner* — Twyler L Haskins
*Assistant Examiner* — Dwight Alex C Tejano

(57) ABSTRACT

There is described an apparatus including a camera defining an azimuth axis. A swing supports the camera. The camera is rotatable relative to the swing about the azimuth axis. A yoke is rotatably coupled to the swing about a tilt axis. The swing is rotatable relative to the yoke about the tilt axis. A locking member attached to the swing is movable between a first position and a second position in which the locking member contacts the camera.

16 Claims, 9 Drawing Sheets

(56) References Cited

U.S. PATENT DOCUMENTS

2018/0031175 A1* 2/2018 Stark .................... F16M 11/123
2018/0244211 A1* 8/2018 Minn ...................... F16B 2/065
2019/0093702 A1* 3/2019 Tiefenbrunn ......... F16C 11/106

OTHER PUBLICATIONS

Articulating Platforms, Thorlabs, Sep. 17, 2019 https://www.thorlabs.com/newgrouppage9.cfm.?objectgroup_id=209, 3 pages.

* cited by examiner

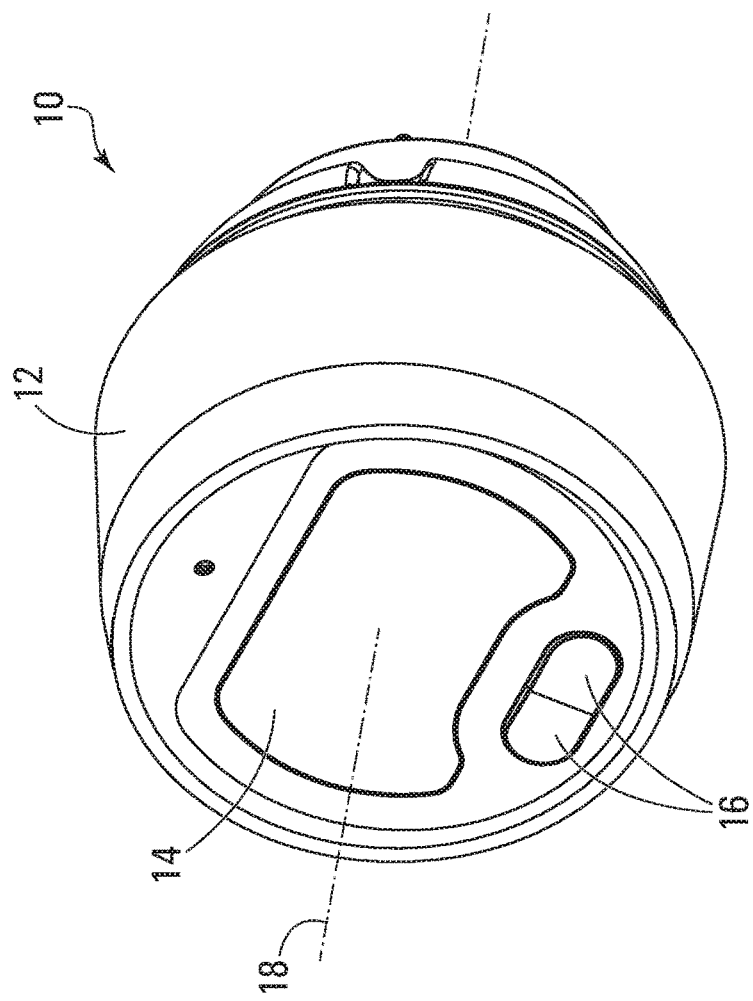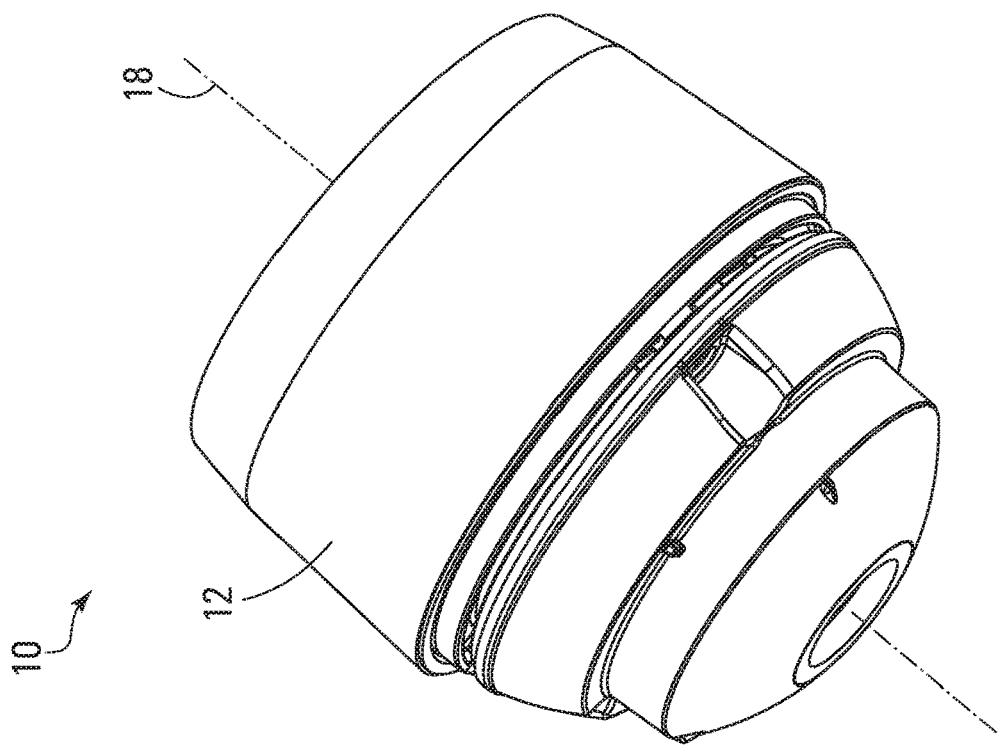

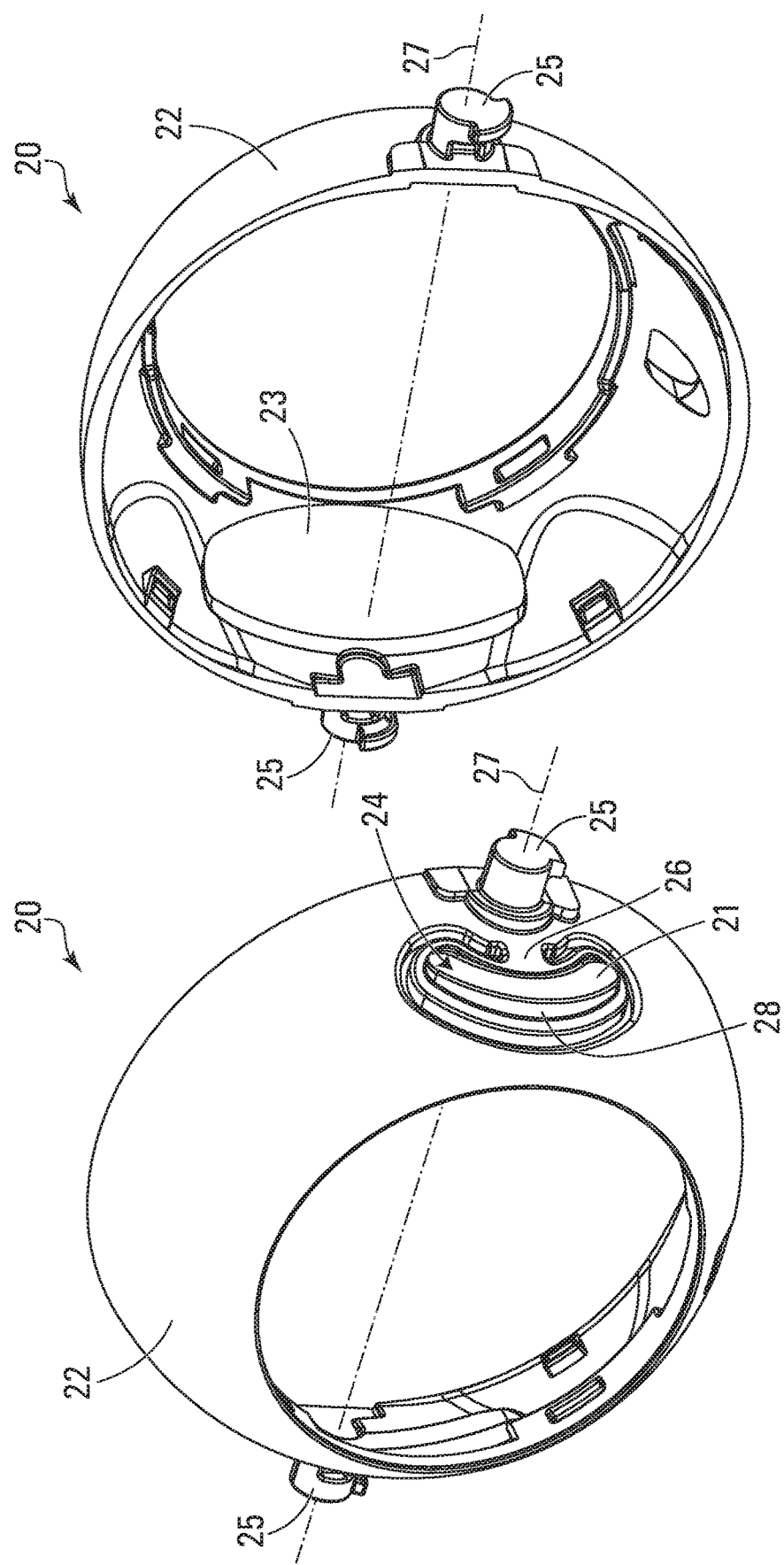

CAMERA WITH LOCKABLE AXES OF ROTATION

BACKGROUND

During the installation of typical dome-style security cameras, measures are usually taken to lock one or more of the primary axes of rotation: pan, tilt, and azimuth. Each axis is first adjusted and then locked to some degree to ensure the aimed camera head does not move during the remainder of installation, or over the lifetime of the camera as a result of vibrations or other external forces. Locking the rotation axes may be particularly important for cameras that are more prone to external forces, such as cameras not enclosed within a protective bubble.

BRIEF DESCRIPTION OF DRAWINGS

In the accompanying figures, similar or the same reference numerals may be repeated to indicate corresponding or analogous elements. These figures, together with the detailed description below, are incorporated in and form part of the specification and serve to further illustrate various embodiments of concepts that include the claimed invention, and to explain various principles and advantages of those embodiments.

FIGS. 2A and 2B are perspective views of a camera according to an embodiment of the disclosure.

FIGS. 3A and 3B are perspective views of a swing according to an embodiment of the disclosure.

Figure 1A:
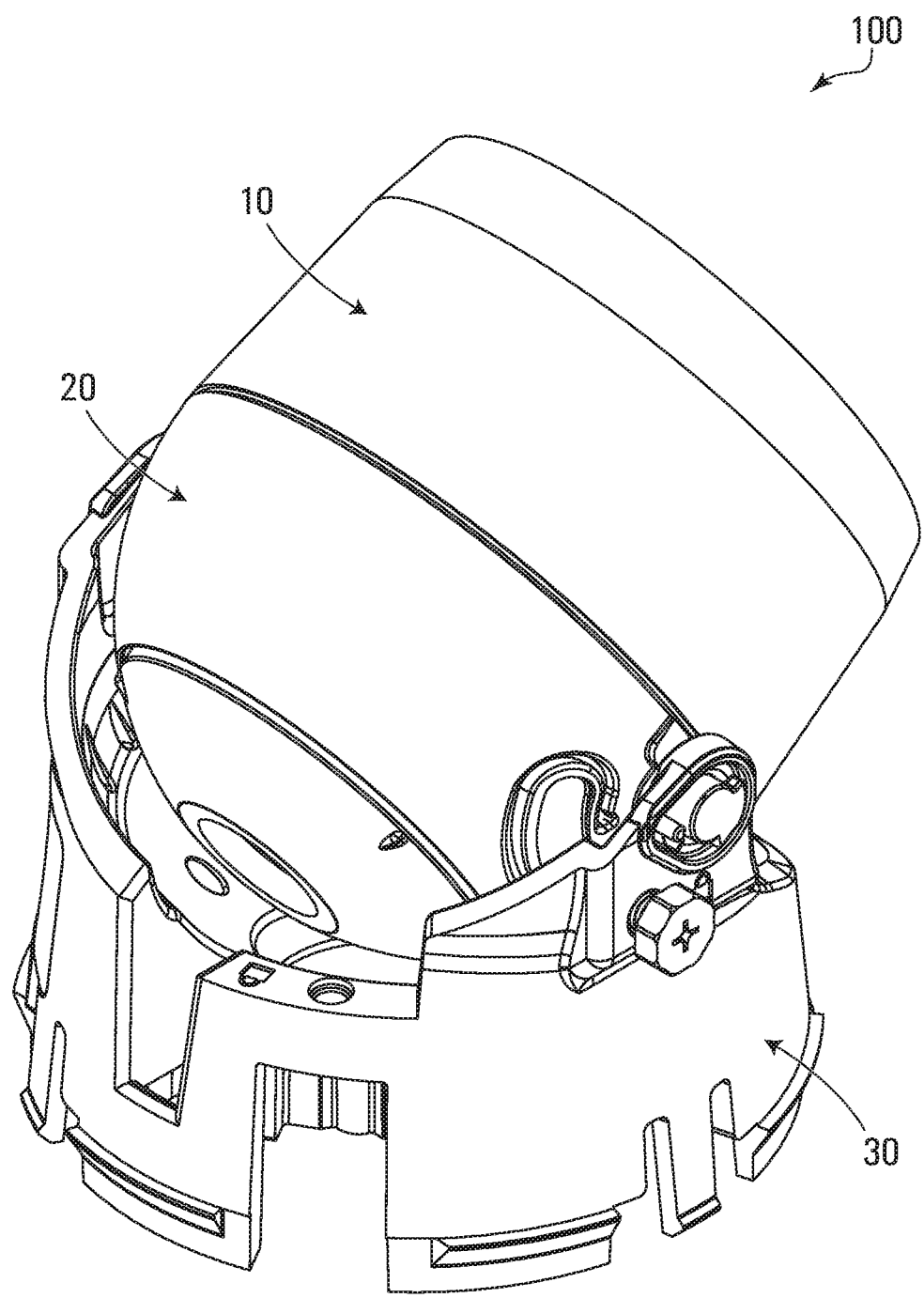
FIGS. 1A and 1B are perspective views of a camera assembly according to an embodiment of the disclosure.
Figure 1B:
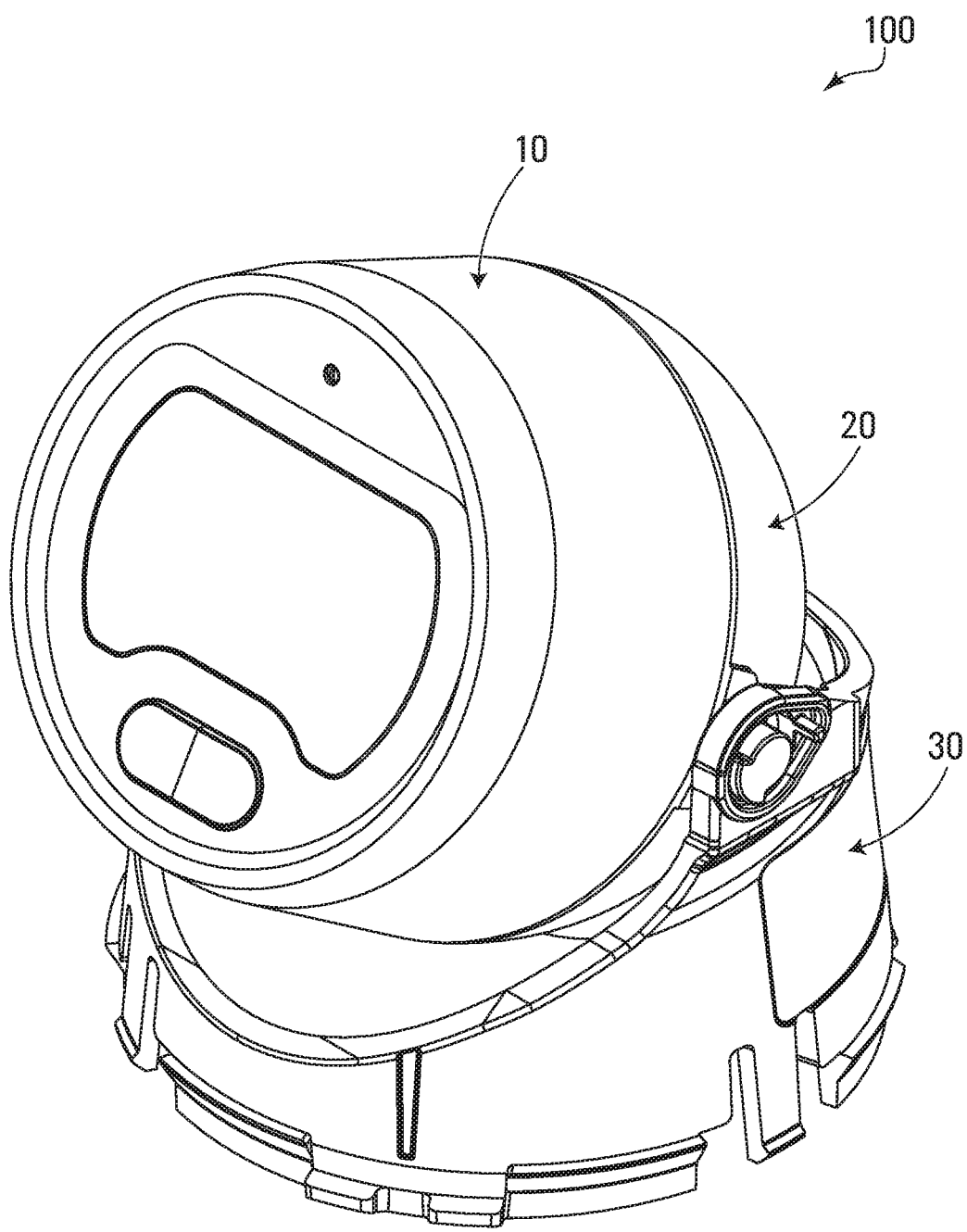

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally, according to embodiments of the disclosure, a camera defines an azimuth axis and is arranged to rotate about the azimuth axis relative to a supporting swing. The swing is rotatably coupled to a yoke about a tilt axis. Rotation of the swing relative to the yoke about the tilt axis results in corresponding rotation of the camera about the tilt axis. A locking member is attached to the swing and is arranged to be moveable between first and second positions. According to some embodiments, the locking member is integrally formed with the swing. In the second position, the locking member contacts the camera and may therefore prevent rotation of the camera about the azimuth axis. Generally, in the first position, the locking member does not contact the camera, or else only contacts the camera to a degree insufficient to prevent rotation of the camera about the azimuth axis.

A locking device is moveable into contact with the locking member for displacing the locking member from the first position to the second position. For example, an aperture formed in the yoke may face at least a portion of the locking member and may be designed to receive an elongate member, such as a fastener. When the elongate member is inserted through the aperture toward the locking member, the elongate member first contacts the locking member in the first position, thereby preventing rotation of the swing relative to the yoke about the tilt axis. Further movement of the elongate member through the aperture causes the locking member to move from the first position to the second position, thereby preventing rotation of the camera relative to the swing about the azimuth axis. Therefore, according to embodiments of the disclosure, a single locking device (e.g. the elongate member) may be used to lock both the tilt and azimuth angles of the camera.

According to a first aspect of the disclosure, there is provided an apparatus comprising: a camera defining an azimuth axis; a swing supporting the camera, wherein the camera is rotatable relative to the swing about the azimuth axis; a yoke rotatably coupled to the swing about a tilt axis, wherein the swing is rotatable relative to the yoke about the tilt axis; and a locking member attached to the swing and movable between a first position and a second position in which the locking member contacts the camera.

The apparatus may further comprise a locking device moveable into contact with the locking member for displacing the locking member from the first position to the second position.

The locking device may comprise an elongate member, and the apparatus may further comprise an aperture facing at least a portion of the locking member such that when the elongate member is inserted through the aperture and toward the locking member the elongate member will contact the locking member.

The aperture may be formed within the yoke.

The elongate member may comprise a threaded fastener, and the aperture may comprise a threaded bore.

The elongate member and the aperture may be sized such that, when the elongate member is inserted through the aperture and is moved into contact with the locking member, a spring force exerted by the locking member on the elongate member is less than a frictional force exerted between the elongate member and the aperture.

The locking member may be shaped such that a line extending perpendicularly through the aperture and toward the locking member forms an angle with a surface of the locking member of about 85 to about 95 degrees.

A direction of extension of the aperture may be parallel to the tilt axis.

The swing may encircle the camera.

The locking member may be integrally formed with the swing.

The swing may comprise a swing body and a hinge connecting the locking member to the swing body, and the hinge may resiliently bias the locking member toward the first position.

The locking member may comprise a curved groove formed in a surface of the locking member.

The locking member may comprise a first portion for increasing friction between the locking member and the camera, and the first portion may be positioned such that, when the locking member is in the second position, the first portion contacts the camera.

The first portion may comprise one or more of: foam; an elastomer; and a rough surface finish.

The locking member may further comprise a second portion, and the first portion may be positioned between the second portion and the camera.

The first portion may comprise foam, the second portion may comprise a non-foam material, and the foam may be positioned between the non-foam material and the camera.

According to a further aspect of the disclosure, there is provided a method comprising: providing an apparatus comprising: a camera defining an azimuth axis; a swing supporting the camera; a yoke rotatably coupled to the swing about a tilt axis; and a locking member attached to the swing and movable between a first position and a second position in which the locking member contacts the camera; rotating the swing relative to the yoke so as to orient the camera at a desired tilt angle; thereafter, moving a locking device into contact with the locking member in the first position to thereby, through engagement of the locking device with the locking member, prevent rotation of the swing relative to the yoke; thereafter, rotating the camera relative to the swing so as to orient the camera at a desired azimuth angle; and thereafter, moving the locking member from the first position to the second position to thereby, through engagement of the locking member with the camera, prevent rotation of the camera relative to the swing.

The apparatus may further comprise an aperture facing at least a portion of the locking member. Moving the locking device into contact with the locking member in the first position may comprise inserting the locking device through the aperture. Moving the locking member from the first position to the second position comprises further inserting the locking device through the aperture.

According to a further aspect of the disclosure, there is provided a swing for supporting a camera, comprising: an annular swing body; a locking member movable between a first position and a second position; and a hinge connecting the locking member to the swing body and resiliently biasing the locking member toward the first position.

The locking member may comprise one or more of: foam; an elastomer; and a rough surface finish.

The swing body may define an interior side of the swing and an exterior side of the swing, the locking member may comprise foam and a non-foam material, and the foam may be positioned relative to the non-foam material such that the foam is closer to the interior side of the swing than the non-foam material.

The locking member may comprise a curved groove formed in a surface of the locking member.

This summary does not necessarily describe the entire scope of all aspects. Other aspects, features and advantages will be apparent to those of ordinary skill in the art upon review of the following description of specific embodiments.

Further advantages and features consistent with this disclosure will be set forth in the following detailed description, with reference to the figures.

Turning to FIGS. 1A and 13, there is shown a camera assembly 100 according to an embodiment of the disclosure. Camera assembly 100 comprises a camera 10, a swing 20 supporting and rotatably engaged with camera 10, and a yoke 30 rotatably coupled to swing 20 swing 20.

FIGS. 2A and 2B show camera 10 in more detail. Camera 10 comprises a camera body 12 in which are housed one or more electronic components (not shown) and one or more optical components (not shown) enabling camera 10 to form and capture an image for subsequent processing. For example, camera body 12 may house one or more lenses and/or other optical components that are arranged to focus light entering camera body 12 onto a digital image sensor.

As can be seen in FIG. 23 which shows a front of camera 10, camera 10 includes a front optical element 14 through which light may enter camera body 12 before passing through an aperture (not shown) and reaching a digital image sensor. Camera 10 may also include infrared illuminators 16 for illuminating a scene with infrared light, for example when camera 10 is operating in a low-light mode.

Camera 10 defines a longitudinal axis (referred to as azimuth axis 18) extending centrally through camera 10. The optical and other components housed within camera body 12 are fixed relative to camera body 12, and rotation of camera 10 about azimuth axis 18 will result in corresponding rotation of such components about the azimuth axis 18. Therefore, the orientation of the image captured by the digital image sensor housed within camera body 12 depends on the particular angular orientation of camera 10 about azimuth axis 18.

Figure 4:
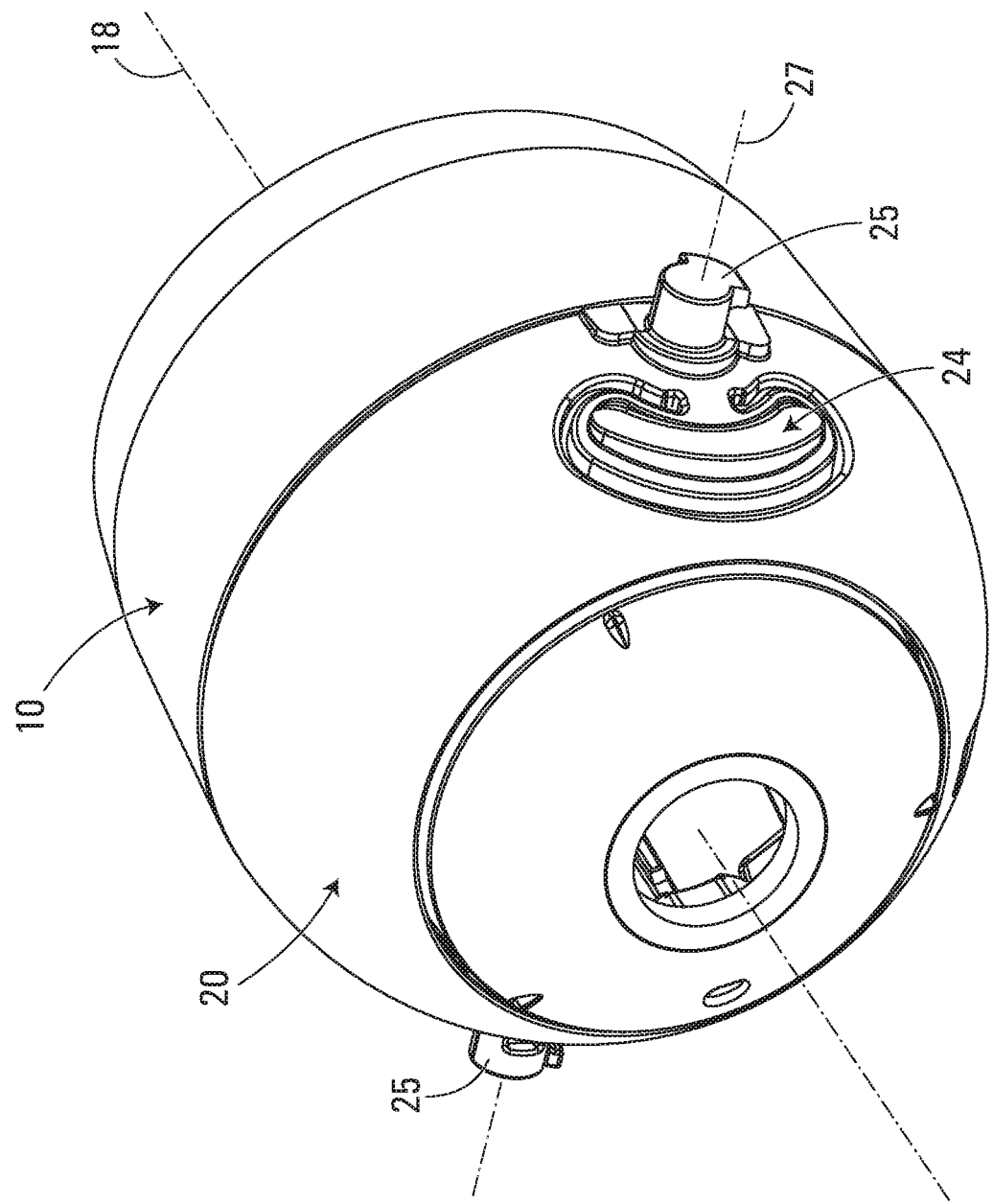
FIG. 4 is a perspective view of the camera of FIGS. 2A and 2B mounted within the swing of FIGS. 3A and 3B, according to an embodiment of the disclosure.

FIGS. 3A and 3B show swing 20 in more detail. Swing 20 comprises a generally annular-shaped swing body 22 that encircles and engages camera body 12, as can be seen in FIG. 4. On one side of swing body 22 is located a resiliently biased and flexible locking member 24. Locking member 24 is integrally formed with swing body 22. In particular, locking member 24 is formed as a partial cutaway of swing body 22. Locking member 24 is hingedly connected to swing body 22 via a hinge 26. Locking member 24 comprises a raised portion 28 with a curved groove or track 21 formed in a surface of raised portion 28. Locking member 24 is movable between first and second positions, described in further detail below, by pivoting about hinge 26. Hinge 26 resiliently biases locking member 24 toward the first position (as seen in FIG. 3A).

As can be seen in FIG. 3B, locking member 24 comprises a foam member 23 on a camera-facing side of locking member 24. The camera-facing side of locking member 24 may be a side of locking member 24 that is designed to engage or otherwise comes into contact with camera body 12. Foam member 23 is attached (by using a suitable adhesive, for example) to the rear side of raised portion 28 of locking member 24.

As described in further detail below, foam member 23 is used to generate friction between camera body 12 and locking member 24 when locking member 24 contacts camera body 12. According to some embodiments, instead of foam member 23, locking member 24 may comprise over-molded rubber, or a rough surface finish, for example. Camera body 12 may additionally comprise a rough surface finish, for example.

Returning to FIG. 3A, swing 20 further includes a pair of coupling axles 25 for rotatably coupling swing 20 to yoke 30, as described in further detail below. Coupling axles 25 extend out of swing body 22 and the pair of coupling axles 25 define an axis of rotation (referred to as tilt axis 27) about which swing 20 may pivot relative to yoke 30.

FIG. 4 shows camera 10 mounted within and supported by swing 20 swing 20. Through the engagement of camera 10 with swing 20, camera 10 and swing 20 may rotate together about tilt axis 27. However, camera 10 may rotate independently of swing 20 about azimuth axis 18, by rotating within swing 20 swing 20.

Figure 5B:
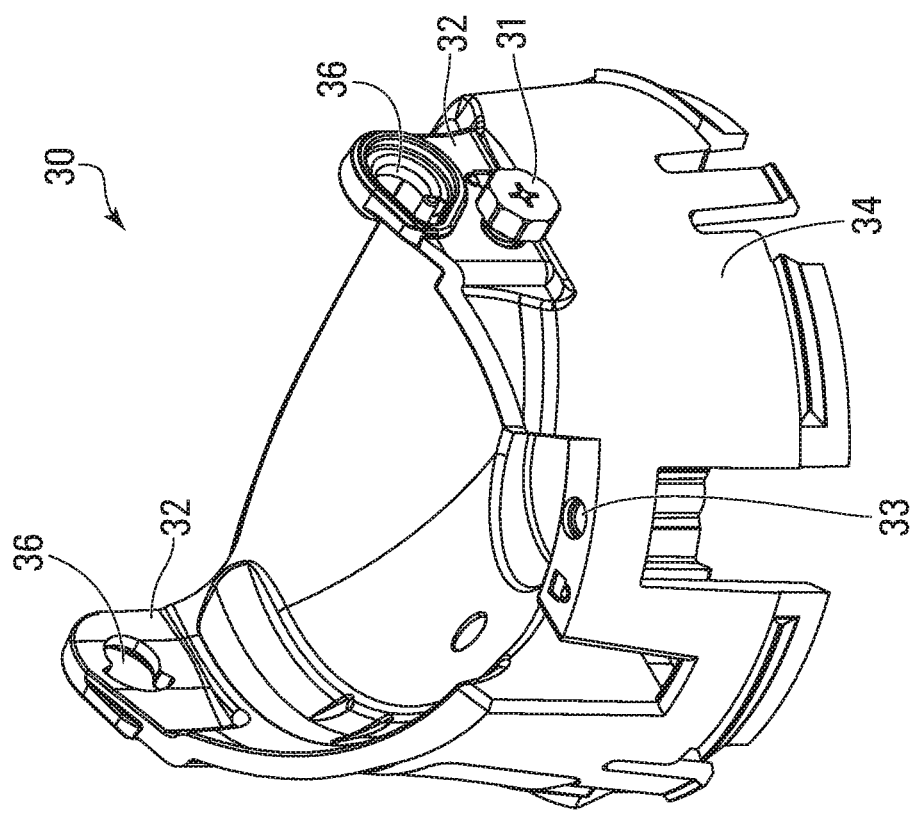
FIGS. 5A and 5B are perspective views of a yoke according to an embodiment of the disclosure.
Figure 5A:
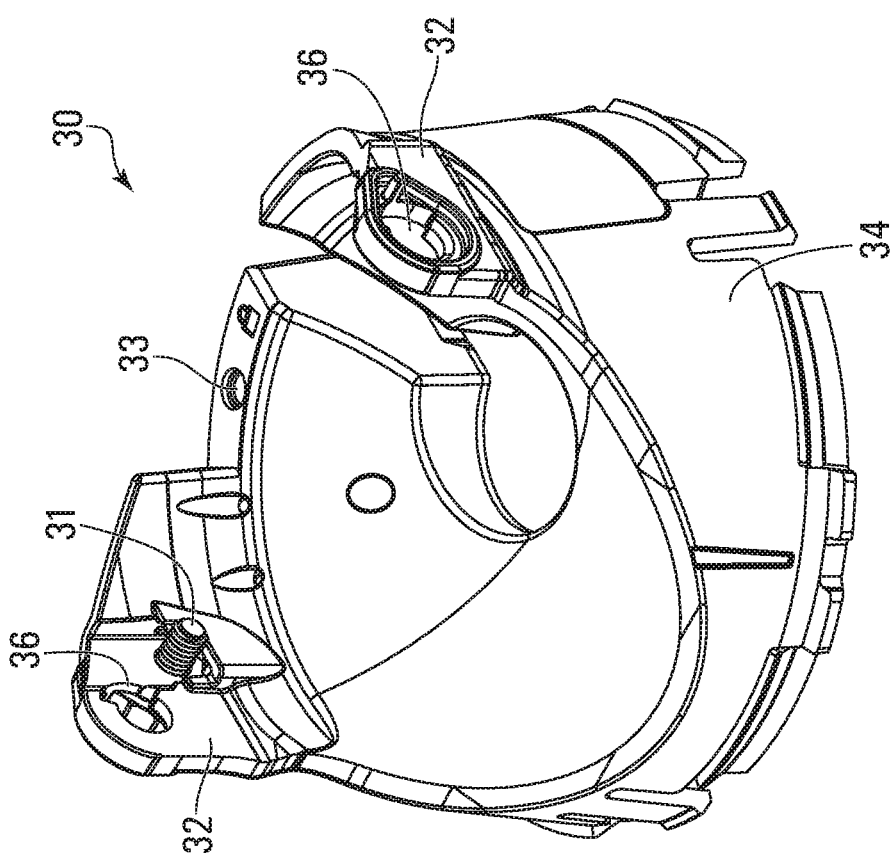
Figure 6:
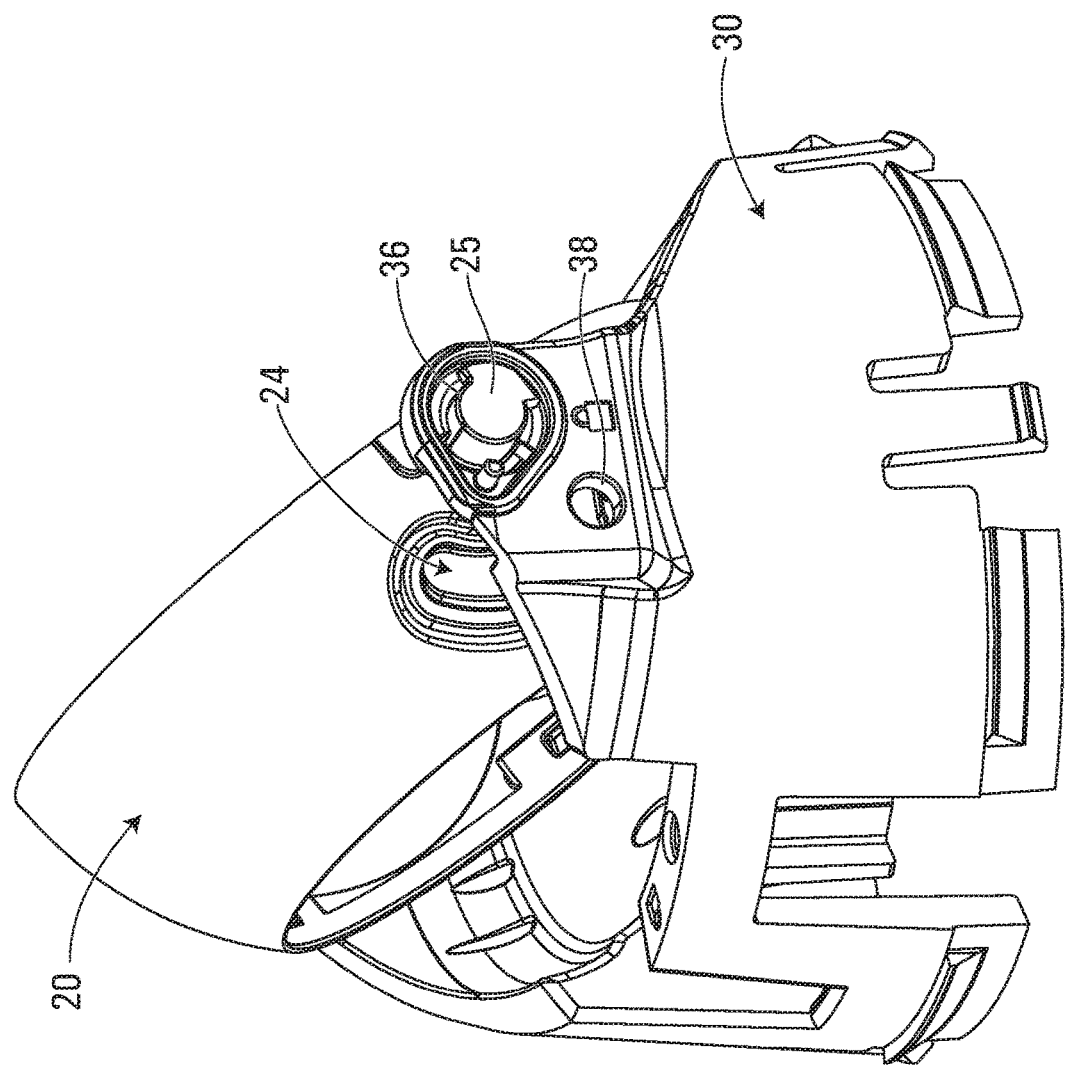
FIG. 6 is a perspective view of the swing of FIGS. 3A and 3B coupled to the yoke of FIGS. 5A and 5B, according to an embodiment of the disclosure.

Turning to FIGS. 5A and 5B, there is shown yoke 30 in more detail. Yoke 30 comprises supports 32 extending from a yoke base 34. A yoke coupling aperture 36 is formed in each support 32. Yoke coupling apertures 36 are configured to receive swing coupling axles 25 and enable rotation of swing coupling axles 25 therewithin. Adjacent one of yoke coupling apertures 36 is located a threaded bore 38 extending through the corresponding support 32. Threaded bore 38 is not shown in FIGS. 5A and 5B but is shown in FIG. 6. FIGS. 5A and 5B show a locking device such as a locking screw 31 which is threaded through threaded bore 38.

Yoke 30 may further include a second threaded bore 33 formed within yoke base 34. Threaded bore 33 may also be designed to receive a locking screw therethrough that may be used to lock yoke 30 to a supporting base (not shown), and thereby prevent rotation of camera assembly 100 about a pan axis (not shown). Such a locking mechanism is not described in further detail herein.

FIG. 6 shows swing 20 rotatably coupled to yoke 30, without camera 10. As can be seen, threaded bore 38 is located within yoke 30 such that a line extending perpendicularly through threaded bore 38 (i.e. the direction of travel of locking screw 31 through threaded bore 38) contacts grooved track 21 of locking member 24. Curved portion 28 of locking member 24 is raised such that grooved track 21 is roughly perpendicular to the direction of travel of locking screw 31 as locking screw 31 is threaded through threaded bore 38. Furthermore, threaded bore 38 extends in a direction parallel to tilt axis 27, and therefore, as camera head 12 is rotated about tilt axis 27, grooved track 21 remains perpendicular to the axis of threaded bore 38. In other words, grooved track 21 is configured such that a line of action of locking screw 31 as locking screw 31 is inserted through threaded bore 38 remains along grooved track 21 as swing 20 is rotated.

Figure 8:
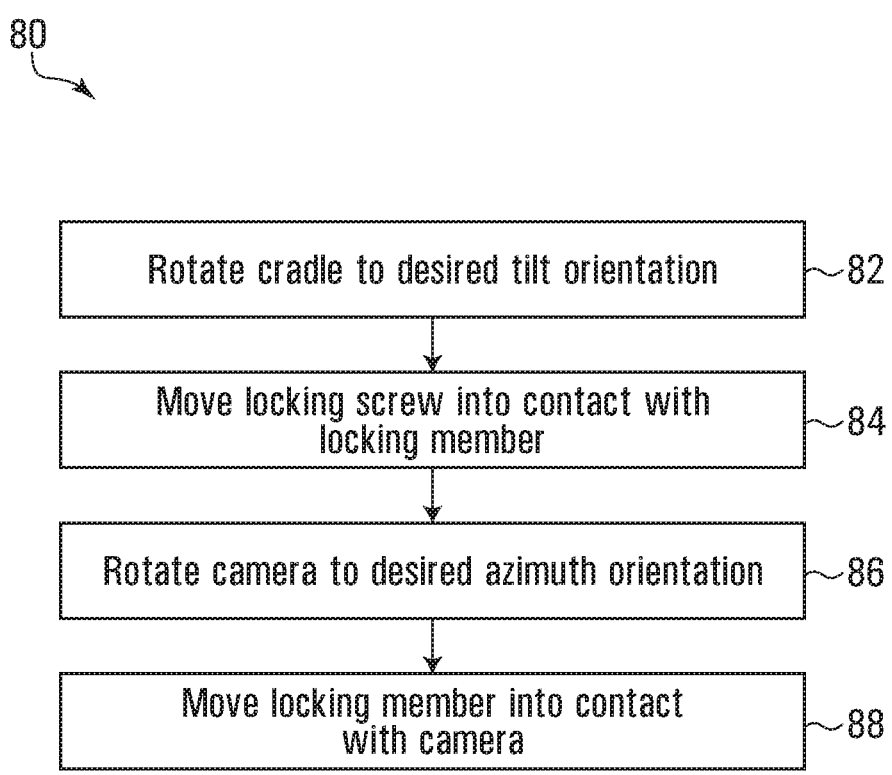
FIG. 8 is a flow diagram of a method of locking axes of rotation of a camera, according to an embodiment of the disclosure.

There will now be described a method of locking the azimuth and tilts axes of rotation 18, 27 of camera assembly 100, according to an embodiment of the disclosure. The method is shown generally in FIG. 8 which shows a flow diagram of the steps that may be taken to lock the azimuth and tilts axes 18, 27. As the skilled person would recognize, the steps shown in FIG. 8 are exemplary in nature, and the order of the steps may be changed, and steps may be omitted and/or added without departing from the scope of the disclosure.

During installation, camera 10 is initially free to rotate about azimuth and tilts axes 18, 27. At block 82, swing 20 is rotated relative to yoke 30 about tilt axis 27 to a desired tilt orientation. Once the desired tilt orientation is achieved, at block 84, the user threads locking screw 31 through threaded bore 38 until locking screw 31 contacts locking member 24. In particular, the end of locking screw 31 is moved toward locking member 24 until locking screw 31 contacts grooved track 21 of locking member 24. The point along grooved track 21 which is contacted by locking screw 31 depends on the particular tilt orientation of camera 10. Upon contacting grooved track 21, the pressure exerted by locking screw 31 on locking member 24 is generally sufficient to prevent rotation of swing 20 relative to yoke 30. Thus, swing 20 and camera 10 are locked in the particular tilt orientation at which camera 10 is set.

After having locked camera 10 in the desired tilt orientation, at block 86, camera 10 is rotated relative to swing 20 about azimuth axis 18 to a desired azimuth orientation. Once the desired azimuth orientation is achieved, at block 88, the user further threads locking screw 31 through threaded bore 38. Due to the flexibility of locking member 24, the further threading of locking screw 31 through threaded bore 38 causes locking member 24 to be displaced from its first position, in which locking member 24 is not in contact with camera 10, to its second position, in which locking member 24 is pushed against and into contact with camera body 12. In particular, locking member 24 pivots about hinge 26 of swing 20 as locking member 24 moves to the second position.

In the second position, foam member 23 on the camera-facing side of locking member 24 is pushed against camera body 12, and the pressure exerted by foam member 23 on camera body 12 prevents, in response to a reasonable force, rotation of camera 10 relative to swing 20 swing 20. A reasonable force should be interpreted broadly as any potentially disturbing force that camera assembly 100 is likely to be exposed to during installation or operation, such as, but not limited, vibrations. Thus, camera 10 is locked in the particular azimuth orientation at which camera 10 is set. Foam member 23 assists with the frictional engagement between locking member 24 and camera body 12. In addition, locking member 24 and locking screw 31 may provide a measure of resistance against deliberate interference with the orientation of camera 10.

Figure 7:
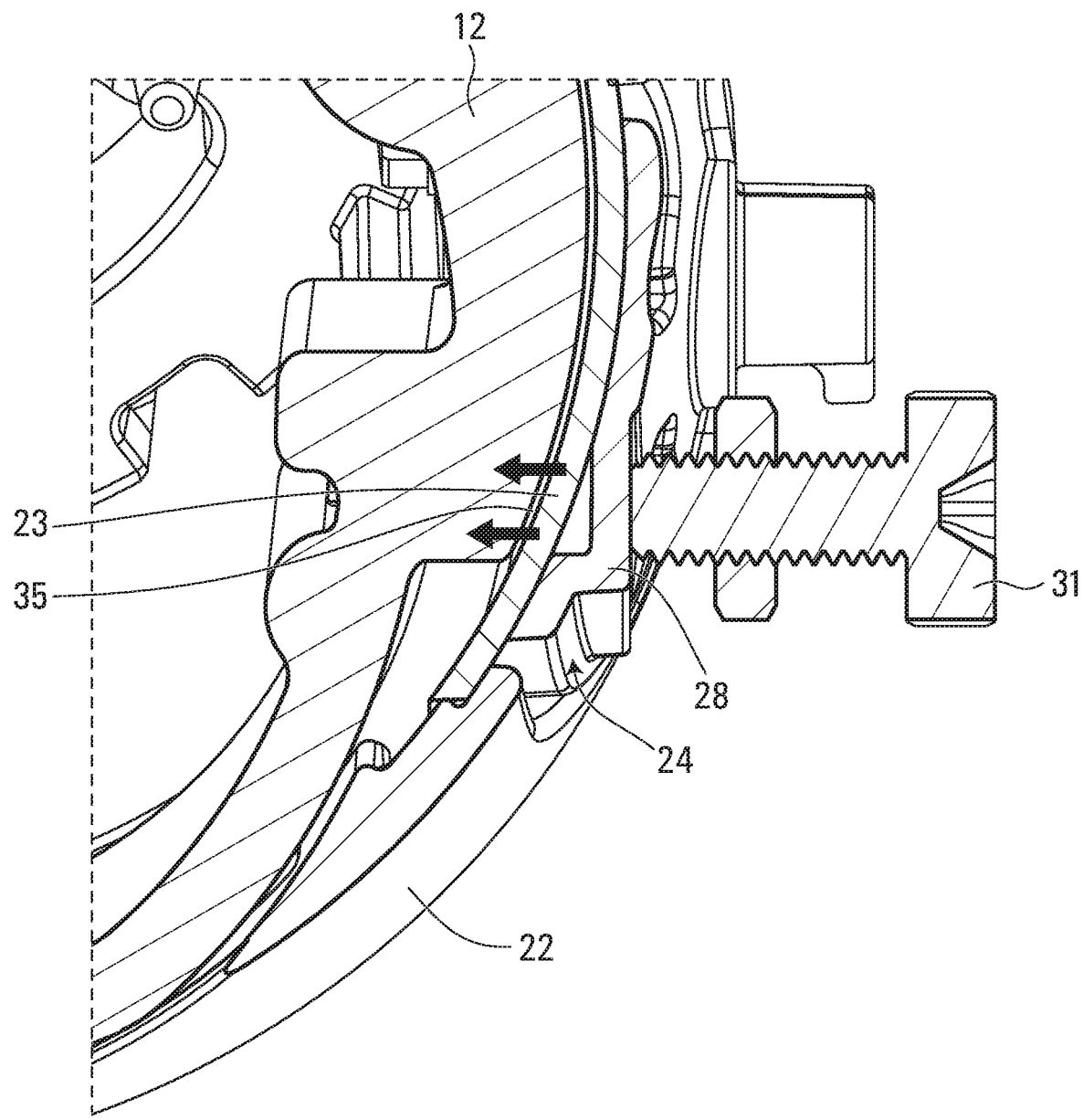
FIG. 7 is a cross-sectional view of a locking screw engaging a locking member, according to an embodiment of the disclosure.

FIG. 7 shows locking member 24 in the first position, with locking screw 31 contacting raised portion 28. A gap 35 is present between foam member 23 and camera body 12. The arrows indicate the direction of flexing of locking member 24 as locking screw 31 is further threaded through threaded bore 38, thereby bringing locking member 24 from the first position to the second position in which foam member 23 is pushed against and into contact with camera body 12. The raised nature of raised portion 28 assists in ensuring that the line of action of locking screw 31 is roughly perpendicular to locking member 24, to assist with a more effective transfer of force between locking screw 31 and locking member 24.

While in the above embodiment locking member 24 has been described as being integrally formed with swing 20, this is not essential. For example, while being attached or fixed relative to swing 20, locking member 24 may be a component that is separate to and distinct from swing 20 swing 20.

Furthermore, while in the above embodiment threaded bore 38 has been described as being formed within yoke 30, this is not essential. For example, threaded bore 38 may be located in a component that is separate to and distinct from yoke 30.

According to some embodiments, locking screw 31 does not need to be threaded. For example, any suitable elongate member may be inserted through an appropriately sized aperture in order to engage with locking member 24. The relative sizes of the elongate member and the aperture may be selected such that a frictional force between the elongate member and the aperture may be greater than a spring force exerted by the locking member on the elongate member in response to the locking member having been displaced by the elongate member. For example, a suitable interference fit between the elongate member and the aperture may achieve such a goal.

According to some embodiments, there may be no need for the camera assembly to include an elongate member or aperture. For example, other means of moving the locking member 24 from is first position to its second position may be used.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing", or any other variation thereof, are intended to cover a non-exclusive inclusion, such that a process, method, article, or apparatus that comprises, has, includes, or contains a list of elements does not include only those elements but may include other elements not expressly listed or inherent to such a process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about", or any other version thereof are defined as being close to as understood by one of ordinary skill in the art, and in one non-limiting embodiment the term is defined to be within 10%, in another embodiment within 5%, in another embodiment within 1%, and in another embodiment within 0.5%. The term "one of", without a more limiting modifier such as "only one of", and when applied herein to two or more subsequently defined options such as "one of A and B", should be construed to mean an existence of any one of the options in the list alone (e.g. A alone or B alone) or any combination of two or more of the options in the list (e.g. A and B together). A device or structure that is "configured" in a certain way is configured in at least that way, but may also be configured in ways that are not listed.

The terms "coupled", "coupling", or "connected" as used herein can have several different meanings depending on the context in which these terms are used. For example, the terms "coupled", "coupling", or "connected" can have a mechanical or electrical connotation. For example, as used herein, the terms "coupled", "coupling", or "connected" can indicate that two elements or devices are directly connected to one another or connected to one another through an intermediate element or device via an electrical element, electrical signal, or a mechanical element depending on the particular context.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject-matter lies in less than all features of a single disclosed embodiment. Thus, the following claims are hereby incorporated into the Detailed Description, with each claim standing on its own as separately claimed subject-matter.

The invention claimed is:

1. An apparatus comprising:
   a camera defining an azimuth axis;
   a swing supporting the camera, wherein the camera is rotatable relative to the swing about the azimuth axis;
   a yoke rotatably coupled to the swing about a tilt axis, wherein the swing is rotatable relative to the yoke about the tilt axis; and
   a locking member attached to the swing and movable between a first position and a second position in which the locking member contacts the camera; and
   a locking device moveable into contact with the locking member for displacing the locking member from the first position to the second position, and
   wherein:
   the locking device comprises an elongate member;
   the apparatus further comprise an aperture facing at least a portion of the locking member such that when the elongate member is inserted through the aperture and toward the locking member the elongate member will contact the locking member; and
   the elongate member and the aperture are sized such that, when the elongate member is inserted through the aperture and is moved into contact with the locking member, a spring force exerted by the locking member on the elongate member is less than a frictional force exerted between the elongate member and the aperture.

2. The apparatus of claim 1, wherein the aperture is formed within the yoke.

3. The apparatus of claim 1, wherein the elongate member comprises a threaded fastener, and wherein the aperture comprises a threaded bore.

4. The apparatus of claim 1, wherein a direction of extension of the aperture is parallel to the tilt axis.

5. The apparatus of claim 1, wherein the swing encircles the camera.

6. The apparatus of claim 1, wherein the locking member is integrally formed with the swing.

7. The apparatus of claim 6, wherein the swing comprises a swing body and a hinge connecting the locking member to the swing body, and wherein the hinge resiliently biases the locking member toward the first position.

8. The apparatus of claim 1, wherein curved groove is formed in a surface of the locking member.

9. An apparatus comprising:
   a camera defining an azimuth axis;
   a swing supporting the camera, wherein the camera is rotatable relative to the swing about the azimuth axis;

a yoke rotatably coupled to the swing about a tilt axis, wherein the swing is rotatable relative to the yoke about the tilt axis;

a locking member attached to the swing and movable between a first position and a second position in which the locking member contacts the camera; and a locking device moveable into contact with the locking member for displacing the locking member from the first position to the second position, and wherein:

the locking device comprises an elongate member;

the apparatus further comprise an aperture facing at least a portion of the locking member such that when the elongate member is inserted through the aperture and toward the locking member the elongate member will contact the locking member; and the locking member is shaped such that a line extending perpendicularly through the aperture and toward the locking member forms an angle with a surface of the locking member of about 85 to about 95 degrees.

10. The apparatus of claim 9, wherein the aperture is formed within the yoke.

11. The apparatus of claim 9, wherein the elongate member comprises a threaded fastener, and wherein the aperture comprises a threaded bore.

12. The apparatus of claim 9, wherein the swing encircles the camera.

13. The apparatus of claim 9, wherein the locking member is integrally formed with the swing.

14. The apparatus of claim 9, wherein a curved groove is formed in a surface of the locking member.

15. A swing for supporting a camera, comprising:

an annular swing body;

a locking member movable between a first position and a second position; and a hinge connecting the locking member to the swing body and resiliently biasing the locking member toward the first position, and wherein the swing body defines an interior side of the swing and an exterior side of the swing, wherein the locking member comprises foam and a non-foam material, and wherein the foam is positioned relative to the non-foam material such that the foam is closer to the interior side of the swing than the non-foam material.

16. The swing of claim 15, wherein the locking member comprises a curved groove formed in a surface of the locking member.

* * * * *